United States Patent
Takahashi et al.

(10) Patent No.: US 7,463,436 B2
(45) Date of Patent: Dec. 9, 2008

(54) LENS DRIVING CONTROL APPARATUS

(75) Inventors: Tatsuya Takahashi, Gifu (JP); Seigo Yamanaka, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/850,508

(22) Filed: Sep. 5, 2007

(65) Prior Publication Data

US 2008/0055753 A1 Mar. 6, 2008

(30) Foreign Application Priority Data

Sep. 6, 2006 (JP) ............................. 2006-241242

(51) Int. Cl.
G02B 7/02 (2006.01)
G02B 15/14 (2006.01)
G03B 17/00 (2006.01)
G03B 13/00 (2006.01)

(52) U.S. Cl. .................... 359/824; 359/696; 396/55; 348/345

(58) Field of Classification Search ................. 359/813, 359/814, 824, 696; 396/48, 52–55, 75, 85, 396/263, 264; 369/44.11, 44.14–44.16, 44.22, 369/44.28, 44.32, 44.34, 30.15, 30.17; 348/208.4, 348/208.99, 335, E5.028, E5.045, 345
See application file for complete search history.

(56) References Cited

U.S. PATENT DOCUMENTS

| 4,764,911 | A | * | 8/1988 | Morota et al. ............ 369/30.15 |
| 5,444,512 | A | * | 8/1995 | Morizumi ..................... 396/55 |
| 5,696,999 | A | * | 12/1997 | Matsushima et al. .......... 396/55 |
| 5,758,202 | A | * | 5/1998 | Amanuma et al. ............ 396/55 |
| 5,850,575 | A | * | 12/1998 | Ohishi .......................... 396/52 |
| 5,864,722 | A | * | 1/1999 | Aoki et al. .................. 396/263 |
| 5,878,599 | A | * | 3/1999 | Halassek ...................... 66/214 |
| 5,905,917 | A | * | 5/1999 | Imura .......................... 396/55 |
| 6,332,060 | B1 | * | 12/2001 | Miyamoto et al. ............ 396/55 |
| 6,757,488 | B2 | * | 6/2004 | Washisu ....................... 396/55 |
| 2007/0217303 | A1 | * | 9/2007 | Chan et al. ............... 369/44.32 |

FOREIGN PATENT DOCUMENTS

JP 2006-087282 3/2006

* cited by examiner

*Primary Examiner*—Loha Ben
(74) *Attorney, Agent, or Firm*—Fish & Richardson P.C.

(57) ABSTRACT

A lens driving control apparatus comprising: a lens unit including a lens and a lens barrel in which the lens is incorporated; a frame configured to support the lens unit through springs such that the lens unit moves in a movable range in the optical axis direction; a voice coil motor including a driving coil to drive the lens unit in the optical axis direction; a motor driver configured to supply a driving current to the driving coil; and a driver controlling circuit configured to control the motor driver such that a standby time period to suppress vibration of the lens unit is set every time the lens unit moves a distance as a unit, which distance is obtained by dividing the movable range by a predetermined number.

7 Claims, 4 Drawing Sheets

LENS DRIVING CONTROL APPARATUS

CROSS-REFERENCE TO RELATED APPLICATION

This application claims the benefit of priority to Japanese Patent Application No. 2006-241242, filed Sep. 6, 2006, of which full contents are incorporated herein by reference.

BACKGROUND OF THE INVENTION

1. Field of the Invention

The present invention relates to a lens driving control apparatus that drives a lens unit in the optical axis direction using a voice coil motor, the lens unit being configured such that a lens is incorporated in a lens barrel.

2. Description of the Related Art

Each of most models of existing portable phones is a so-called "camera-included portable phone" that is mounted with a camera. A camera mounted on a camera-included portable phone is generally configured using a so-called "camera module" formed by integrating a solid state image sensing device such as a CMOS image sensor, a CCD image sensor, etc., with a lens unit that projects an object image onto the solid state image sensing device.

Many of the cameras mounted on the camera-included portable phones each have an automatic focusing function that automatically focuses on an object and, in a camera module with the above automatic focusing function, focusing adjustment can be executed by displacing a lens unit for focusing adjustment in the optical axis direction.

A camera module with an automatic focusing function can be a camera module that is adapted to drive a lens unit that is configured by a lens incorporated in a lens barrel in the optical axis direction using a voice coil motor (see, for example, Japanese Patent Application Laid-Open Publication No. 2006-087282).

The above camera module using a voice coil motor is adapted, for example, to support a lens unit being displaceable against a frame using springs, and to attach a driving coil to the lens unit and drive the lens unit in the optical axis direction using a voice coil motor including a magnetic circuit that forms a magnetic field that acts on the driving coil. The driving of the lens unit is controlled by a lens driving control apparatus that controls a driving current supplied from a motor driver to the driving coil of the voice coil motor.

In the camera module using the voice coil motor as above, when the lens unit is significantly displaced in the optical axis direction to focus on an object image, the lens unit collides with the frame and an impulsive sound is generated.

For a lens driving control apparatus of a conventional camera module, the generation of this impulsive sound has not been especially considered as a problem and no measures have been taken against the impulsive sound.

However, the generation of the impulsive sound is not preferable for the quality level and, with the increase of the driving speed of the lens unit, the impulsive sound can not be ignored.

SUMMARY OF THE INVENTION

A lens driving control apparatus according to an aspect of the present invention, comprises: a lens unit including a lens and a lens barrel in which the lens is incorporated; a frame configured to support the lens unit through springs such that the lens unit moves in a movable range in the optical axis direction; a voice coil motor including a driving coil to drive the lens unit in the optical axis direction; a motor driver configured to supply a driving current to the driving coil; and a driver controlling circuit configured to control the motor driver such that a standby time period to suppress vibration of the lens unit is set every time the lens unit moves a distance as a unit, which distance is obtained by dividing the movable range by a predetermined number.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
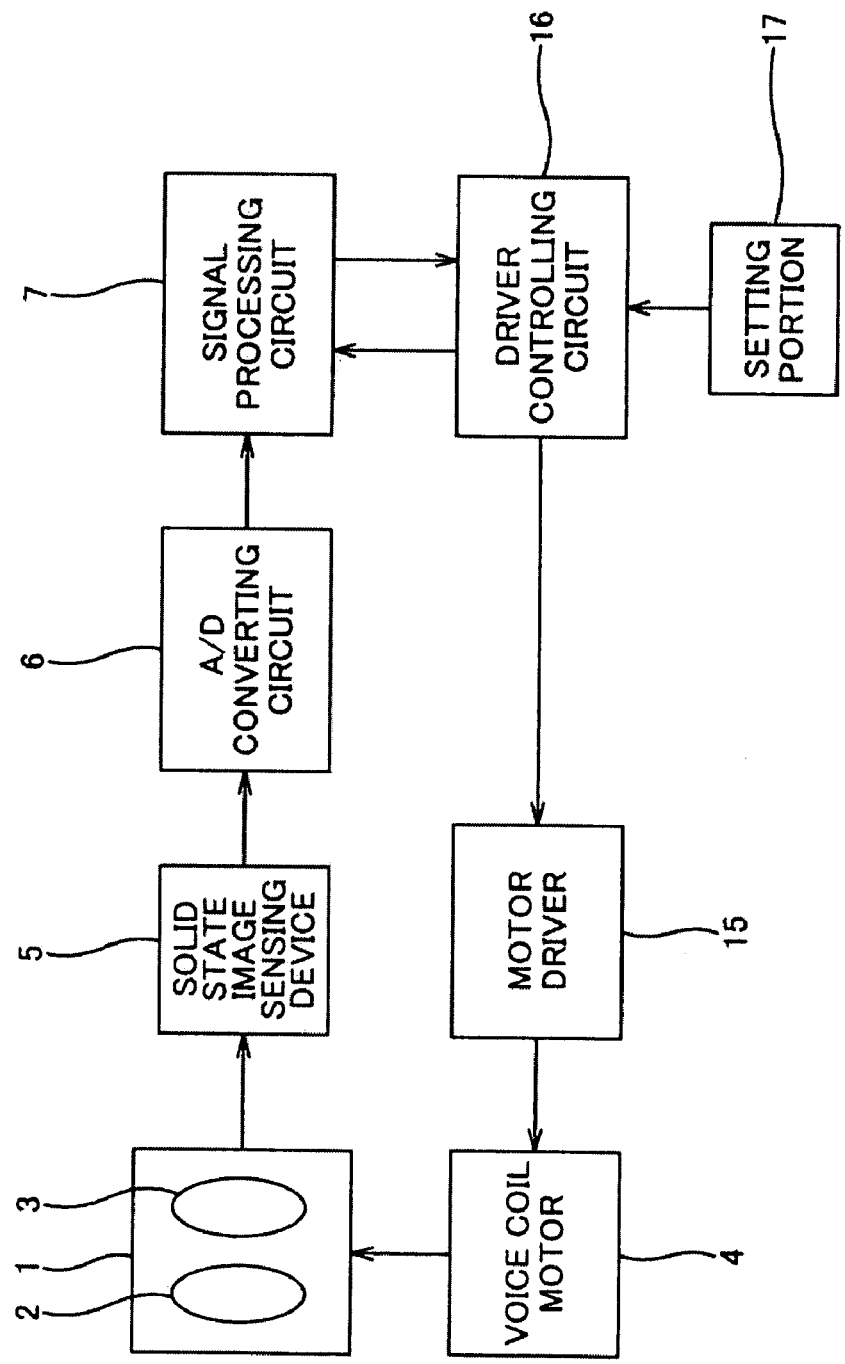
FIG. 1 is a circuit block diagram of a lens driving control apparatus according to an embodiment of the present invention.

FIG. 1 is a circuit block diagram of a case where a lens driving control apparatus according to an embodiment of the present invention is applied to a camera module having an automatic focusing function.

A lens unit 1 is configured by a front lens 2 and a rear lens 3. The front lens 2 and the rear lens 3 can be collectively driven in the optical axis direction by a voice coil motor 4 to be able to adjust the focus.

An object image obtained through the lens unit 1 is received by a solid state image sensing device 5 that is configured with a plurality of pixels, e.g., a CMOS image sensor, a CCD image sensor. A received light output obtained from the solid state image sensing device 5 is converted into a digital signal by an A/D converting circuit 6 and, thereafter, is input into a signal processing circuit 7. By signal processing, the signal processing circuit 7 produces a YUV signal that includes a brightness signal Y, a blue difference signal U, and a red difference signal V of an image signal.

Figure 2:
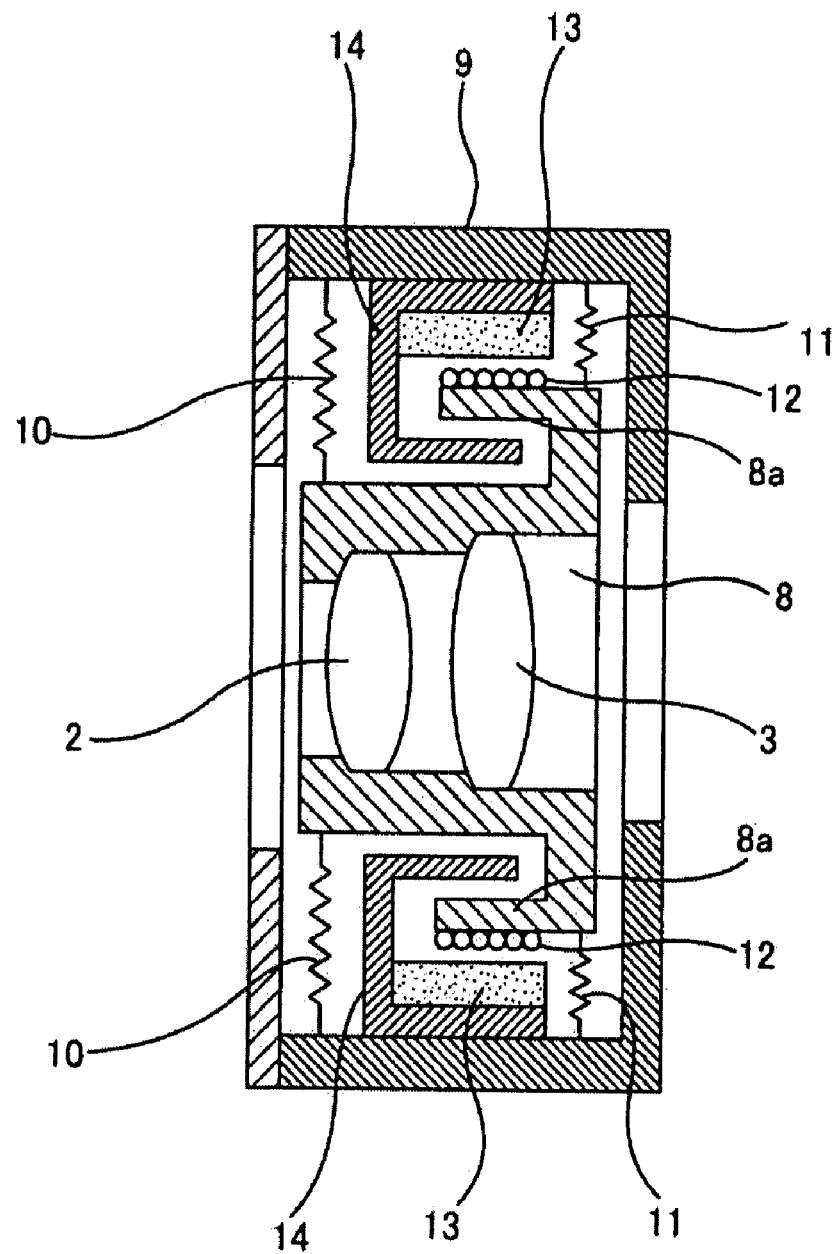
FIG. 2 is a cross-sectional view of an example of a lens unit 1 and a voice coil motor 4 that are used in the lens driving control apparatus shown in FIG. 1.

FIG. 2 is a schematic cross-sectional view of an example of the lens unit 1 and the voice coil motor 4. The front lens 2 and the rear lens 3 are incorporated in a lens barrel 8 to form the lens unit 1. The lens barrel 8 is displaceably supported in the optical axis direction against a frame 9 that is an outer frame by leaf springs 10 and 11 that are each cut at two positions of the head and the tail thereof into the shape of a butterfly damper. A driving coil 12 is wound around a bobbin portion 8a of the lens barrel 8 centering the optical axis. A permanent magnet 13 and a yoke 14 that generate an effective flux over the driving coil 12 are fixed to the frame 9. Therefore, the lens unit 1 is driven in the optical axis direction in response to a driving current supplied to the driving coil 12 of the voice coil motor 4. The lens unit 1 is adapted to able to be driven such that the lens unit 1 is let out forward, i.e., leftward in the FIG.

2 relative to the frame 9 based on a mechanical position for the lens unit 1 to stop as a reference position d(0). When the lens unit 1 is at the reference position d(0), the focal point is at the infinite distance and panning focus for ordinary shooting is set. By letting out the lens unit 1 forward, the focal distance becomes shorter and the setting is changed to macro shooting. When the lens unit 1 is let out forward to the forward movable range limit d(max), the focal distance becomes the shortest that is, for example, 10 cm.

Figure 3:
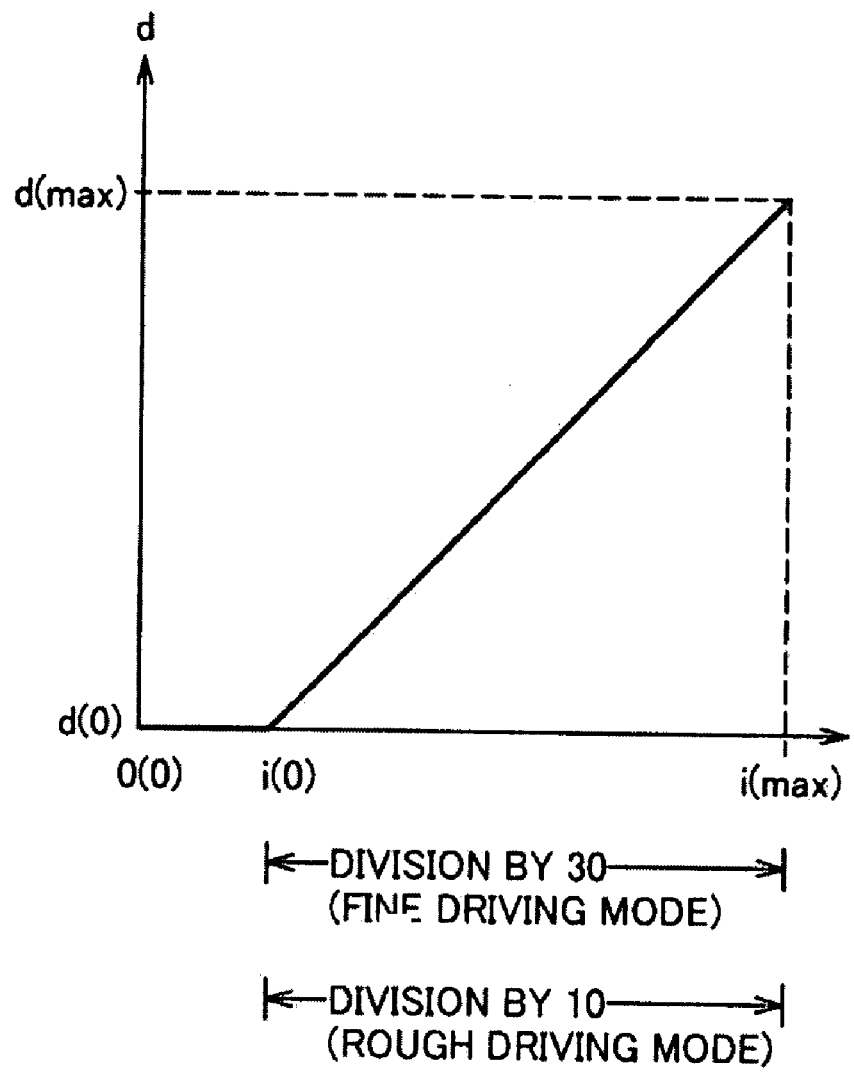
FIG. 3 is a property chart of a moving distance "d" of the lens unit 1 to a driving current i to be supplied to the voice coil motor 4.

As shown in FIG. 3, a moving distance "d" of the lens unit 1 for the current value i of the driving current supplied to the voice coil motor 4 has an insensitive region for which the lens unit 1 is not driven from the reference position d(0) while the current value i is varied from "0" to i(0). The moving distance is increased substantially linearly with the increase of the current value from a current value i(0) of the driving current at the starting point at which the lens unit 1 starts moving to a current value i(max) of the driving current by which the lens unit 1 is driven forward to the forward movable range limit d(max) in front of the lens unit 1.

The driving current supplied to the voice coil motor 4 is generated by a motor driver 15 and the driving current generated by the motor driver 15 is controlled by a driver controlling circuit 16.

The driver controlling circuit 16 stores data that can show each of moving distances of the lens unit 1 corresponding to each driving current, which distances are obtained by evenly dividing in advance by 30 the movable range of the lens unit 1 from the reference position d(0) of the lens unit 1 to the forward movable range limit d(max) of the lens unit 1, and thereby the driver controlling circuit 16 controls such that, when a moving distance of the lens unit 1 is set, a current value to be set in the motor driver 15 is converted from the moving distance of the lens unit 1 and the driving current having the converted current value is generated from the motor driver 15.

In this case, in the movable range of the lens unit from the reference position d(0) of the lens unit 1 to the forward movable range limit d(max) of the lens unit 1 except the insensitive region, the relation between the current value i of the driving current and the moving distance d of the lens unit 1 is a proportional relation with excellent linearity. Therefore, in this range, the relation between the current value i of the driving current and the moving distance d of the lens unit 1 can be calculated using a simple linear function.

Figure 4:
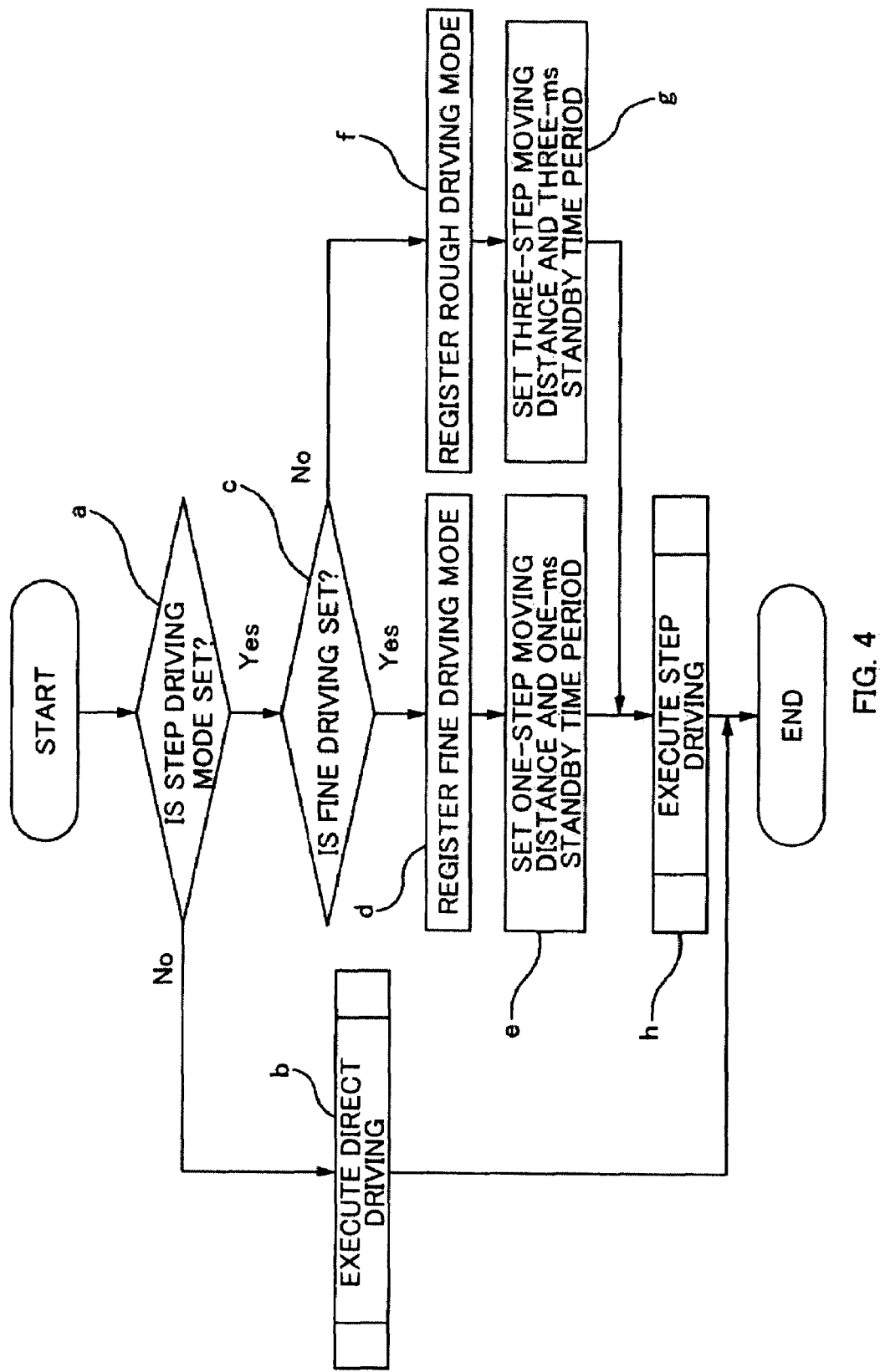
FIG. 4 is a flowchart of a setting method of a driving mode for the lens driving control apparatus shown in FIG. 1.

The driver controlling circuit 16 is adapted to control the motor driver 15 such that the motor driver 15 causes the lens unit 1 to operate corresponding to a driving mode selected by a setting portion 17. The setting portion 17 is adapted to select the driving mode as shown in a flowchart of FIG. 4.

The driving modes of the lens unit 1 are roughly divided into two types of a step driving mode, and a direct driving mode. In the step driving mode, the driver controlling circuit 16 controls to cause the motor driver 15 to generate stepwise a driving current by an amount corresponding to the number of steps corresponding to the moving distance of the lens unit 1, which driving current is varied for each of reference current value units set based on the reference moving distance unit obtained by dividing evenly by 30 the movable range of the lens unit 1. In the direct driving mode, the driver controlling circuit 16 controls to cause the motor driver 15 to generate directly a driving current having a converted current value obtained by calculating the number of steps of the reference moving distance units corresponding to the moving distance of the lens unit 1, and by summing the above number of the reference current value units.

The driver controlling circuit 16 is configured by a micro computer and, when driving of the lens unit 1 is requested, determines whether the driving request is for the step driving mode (step a).

The determination of whether the request is for the step driving mode is executed in manual selection by the setting portion 17 and in automatic selection by execution of automatic focusing.

When it is determined that the lens unit 1 is not to be set in the step driving mode, driving of the lens unit 1 is executed in the direct driving mode (step b) and the driver controlling circuit 16 controls to cause the motor driver 15 to generate a driving current having a current value corresponding to the moving distance of the lens unit 1.

On the other hand, when it is determined that the lens unit 1 is to be set in the step driving mode, it is determined whether the setting is a fine driving setting (step c) When it is determined that the setting is the fine driving setting, the fine driving mode (a first step driving mode) is registered in the driver controlling circuit 16 (step d). When the fine driving mode is registered, the driver controlling circuit 16 controls to cause the motor driver 15 to generate a driving current that is varied for each of reference current value units that correspond to the moving distance units obtained by dividing evenly by 30 the movable range of the lens unit 1. A standby time period of one ms (millisecond) is set every time the lens unit 1 is moved by one step by the moving distance unit for each reference current value unit (step e) and the lens unit 1 is set being driven stepwise by a distance corresponding to the number of steps that correspond to a necessary moving distance of the lens unit 1.

In this case, the one ms that is the standby time period is set such that the free vibration of the lens unit 1 after the lens unit I has been moved by one step is converged to a predetermined amplitude or narrower.

It is determined whether the fine driving setting is set (step c). When it is determined that the fine driving setting is not set, a rough driving mode (a second step driving mode) is registered in the driver controlling circuit 16 (step f). When the rough driving mode is registered, the driver controlling circuit 16 controls to cause the motor driver 15 to generate a driving current that is varied for the current value unit corresponding to a current unit that is three times as much as the reference current value unit corresponding to a reference moving distance unit obtained by dividing evenly by 30 the movable range of the lens unit 1, that is, in other words, a driving current that is varied for each current value unit corresponding to a moving distance unit obtained by dividing evenly by 10 the movable range of the lens unit 1, and a three-ms standby time period is set every time the lens unit 1 is moved by one step based on a moving distance unit for each current value unit that is three times as much as the reference current value unit (step g). The lens unit 1 is set being driven stepwise by a distance corresponding to the number of steps corresponding to a necessary moving distance of the lens unit 1.

In this case, the standby time period during the rough driving mode is set being proportional to the relation between a moving distance for one step and the standby time period during the fine driving mode and, because the moving distance unit is three times as long as the reference current value unit, the standby time period is also three times as long as that of the fine driving mode, that is three ms. Therefore, the free vibration of the lens unit 1 after the lens unit 1 has been moved by one step is converged to a predetermined amplitude or narrower due to the standby time period.

When the lens unit 1 is set in the fine driving mode or the rough driving mode, the lens unit 1 is driven stepwise by the one-step moving distance and the standby time period corresponding to the mode being set (step h)

Description will be given for the case where the automatic focusing is executed.

By an executive order of automatic focusing, the driver controlling circuit 16 is set in the step driving mode and is first set in rough driving mode. The driver controlling circuit 16 controls the motor driver 15 such that a driving current to be supplied to the voice coil motor 4 is the current value i(0) for the starting point of the lens unit 1 for the state where the lens unit 1 starts moving corresponding linearly to the increase of the current value i of the driving current while the lens unit 1 is at the reference position. Thereafter, the driver controlling circuit 16 controls the motor driver 15 such that the driving current to be supplied to the voice coil motor 4 is increased stepwise from the current value i(0) by (the current value unit)×3 that is three times as much as the reference current value unit Δi, for each step. Therefore, the lens unit 1 moves stepwise from the starting point by a moving distance unit as one step, which moving distance is obtained by dividing evenly by 10 the movable range, and the lens unit 1 is driven stepwise to the forward movable range limit with a standby time period of three [ms] for each one-step move.

The signal processing circuit 7 obtains a received light output obtained from the solid state image sensing device 5 through the A/D converting circuit 6 for each one-step move of the lens unit 1, extracts a necessary high-frequency component of the received light output using a high-pass filter, integrates the high-frequency component, and, thereby, produces data as contrast component data. The driver controlling circuit 16 captures the contrast component data, determines the highest contrast component obtained between the starting point and the forward movable range limit of the lens unit 1, and sets the current value of the driving current to be generated from the motor driver 15 such that the lens unit 1 is moved to a position somewhat closer to the starting point in the vicinity of the position at which the highest contrast component can be obtained.

When the lens unit 1 is displaced to the position somewhat closer to the starting point in the vicinity of the position at which the highest contrast component can be obtained, the driver controlling circuit 16: is set in the fine driving mode; controls the motor driver 15 such that a driving current that is increased by each reference current value unit Δi from the current value that is converted into a position that the lens unit 1 is displaced to is supplied to the voice coil motor 4; and displaces the lens unit 1, from the position somewhat closer to the starting point, somewhat beyond the position at which the highest contrast component can be obtained, using the fine driving in the vicinity of the position at which the highest contrast component can be obtained. The signal processing circuit 7 obtains the received light output, obtained from the solid state image sensing device 5 through the A/D converting circuit 6 for each one-step move of the lens unit 1 and produces contrast component data.

In this manner, the driver controlling circuit 16 determines the highest contrast component from each contrast component at each position for each one step of the lens unit 1 by the fine driving within the range in the forward and backward directions in the vicinity of the position including the position at which the highest contrast component can be obtained by the rough driving, and sets a current value of a driving current to be generated from the motor driver 15 such that the lens unit 1 is moved to the position at which the highest contrast component can be obtained. That is, the position at which the highest contrast component can be obtained is detected with the precision for the moving distance unit of the lens unit 1 by the fine driving and the lens unit 1 is displaced to the position, and the automatic focusing operation is completed.

In this case, the above automatic focusing operation is executed based on a theory that the highest contrast component can be obtained in the state where the object image projected on the solid state image sensing device 5 is focused. For the automatic focusing, the window pattern area, and the area and the position of the window pattern area of the solid state image sensing device 5 used to obtain the contrast component in a photometric mode such as the center-emphasized photometry, the averaging photometry, or the spot photometry can be switched.

The contrast component corresponds to the focusing determination data for execution of the automatic focusing. The signal processing circuit 7 includes a data generating portion that generates the contrast component of the focusing determination data.

Description will be given for a measure that is taken against the impulsive sound generated when the lens unit 1 collides with the frame 9.

For the structure of the lens unit 1 and the voice coil motor 4 shown in FIG. 2, when the lens unit 1 is returned relative to the frame 9 from a position at which the lens unit 1 has been let out forward that is leftward in FIG. 2 to the mechanical stationary position that is the reference position d(0) of the lens unit 1, there is a high possibility that the rear end face of the lens unit 1 collides with the wall of the frame 9 on the right-hand side of FIG. 2 resulting in the generation of a considerable impulsive sound. That is, the rear end face of the lens unit 1 is adjacent to the right-side wall of the frame 9 when the lens unit 1 is at the reference position d(0), and the driving force of the lens unit 1 is added with the recovering forces of the leaf springs 10 and 11 when the lens unit 1 is returned to the reference position d(0) Therefore, the returning force of the lens unit 1 becomes larger than the force used to let out the lens unit 1 forward. Therefore, being associated with the increase of the speed of the driving by the voice coil motor of the lens unit, the rear end, face of the lens unit 1 collides with the right-side wall of the frame 9.

The above lens driving control apparatus is controlled during the automatic focusing and in the step driving mode when the manual focusing is selected such that the lens unit 1 is returned to the reference position d(0) in the step driving mode. In the case where the lens unit 1 is controlled in the step driving mode, even when the movable range of the lens unit 1 is extended, the vibration amplitude of the leaf springs 10 and 11 that support the lens unit 1 is limited to vibration of small amplitude based on the moving distance unit regardless of the magnitude of the movable range of the lens unit 1. Therefore, even when the recovering forces of the leaf springs 10 and 11 are added to the driving force of the lens unit 1, prevention of the impulsive sound generated by the collision of the lens frame 1 with the frame 9 can be facilitated or the force of the lens unit 1 to collide with the frame 9 is alleviated and the impulsive sound is alleviated.

In this case, when the lens unit 1 is returned to the reference position d(0), the lens unit 1 may be driven by varying the current value stepwise in at least the step driving mode at least to the current value i(0) of the driving current for the starting point of the lens unit 1.

In the state where the lens unit 1 is displaced to the reference position d(0), the driving current of the lens unit 1 is in the range of the current value from i(0) to "0" and it is preferable to set the driving current of the lens unit 1 to be "0" for saving electric power. However, when the current value of the driving current of the lens unit 1 is varied from i(0) to "0", the current value may be varied stepwise in the step driving mode or the current value may be directly varied in the direct driving mode.

As above, according the embodiment, standby time periods are provided to suppress the vibration of the lens unit 1 after the lens unit 1 has been driven and the lens unit 1 is controlled such that the lens unit 1 is driven by moving distance units having been set. Therefore, the amplitude of the vibration of the leaf springs 10 and 11 that support the lens unit 1 generated associated with the displacement of the lens unit 1 can be suppressed to vibration having a small amplitude based on the moving distance unit regardless of the magnitude of the movable range of the lens unit 1. Thereby, prevention of the impulsive sound generated by the collision of the lens frame 1 with the frame 9 can be facilitated or the force of the lens unit 1 to collide with the frame 9 is alleviated and alleviation of the impulsive sound can be facilitated.

The embodiment is adapted to execute selectively the lens driving control by a plurality of moving distance units, and a standby time period from the moment after the lens unit 1 is driven for each moving distance unit set by the driver controlling circuit 16 to the moment the lens unit 1 is driven next time is set in proportion to the driving time period for each moving distance unit for the lens unit 1 to be driven. Therefore, the rough searching and the fine searching for focusing can be selected by varying the moving distance unit of the lens unit 1 while the vibration of the lens unit can be suppressed by the standby time period being set to match the variation of the moving distance of the moving distance unit of the lens unit 1. Therefore, even when the moving distance unit of the lens unit 1 is varied, prevention of the impulsive sound or alleviation of the impulsive sound can be facilitated.

Furthermore, the lens driving control apparatus of the embodiment can be adapted to an automatic focusing operation of a camera module.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A lens driving control apparatus comprising:
    a lens unit including a lens and a lens barrel in which the lens is incorporated;
    a frame configured to support the lens unit through springs such that the lens unit moves in a movable range in the optical axis direction;
    a voice coil motor including a driving coil to drive the lens unit in the optical axis direction;
    a motor driver configured to supply a driving current to the driving coil; and
    a driver controlling circuit configured to control the motor driver such that a standby time period to suppress vibration of the lens unit is set every time the lens unit moves a distance as a unit, which distance is obtained by dividing the movable range by a predetermined number.

2. The lens driving control apparatus of claim 1, wherein the driver controlling circuit selectively executes:
    a first step driving mode of controlling the motor driver such that a first standby time period to suppress vibration of the lens unit is set every time the lens unit moves a first distance as a unit, which first distance is obtained by dividing the movable range by the predetermined number; and
    a second step driving mode of controlling the motor driver such that a second standby time period that is longer than the first standby time period to suppress vibration of the lens unit is set every time the lens unit moves a second distance that is longer than the first distance as a unit.

3. The lens driving control apparatus of claim 2, wherein the second distance is an integral multiple of the first distance.

4. The lens driving control apparatus of claim 2, wherein the first and the second standby time periods are respectively proportional to driving time periods of the first and second distances.

5. The lens driving control apparatus of claim 2, further comprising:
    a solid state image sensing device configured to receive light of an object image obtained through the lens unit: and
    a data generating circuit configured to generate focusing determination data based on a pixel signal obtained from the solid state image sensing device, wherein
    when an automatic focusing operation is executed, the driver controlling circuit selectively executes the first step driving mode and the second step driving mode according to the focusing determination data to move the lens unit to a focusing position for an object.

6. The lens driving control apparatus of claim 5, wherein the data generating circuit generates the focusing determination data every time the lens unit moves the first distance or the second distance.

7. The lens driving control apparatus of claim 5, wherein the focusing determination data is contrast component data.

* * * * *